(12) United States Patent
Yoshida

(10) Patent No.: US 6,567,600 B2
(45) Date of Patent: May 20, 2003

(54) OPTICAL AMPLIFYING MEDIUM COMPONENT AND OPTICAL FIBER AMPLIFIER HAVING THE SAME

(75) Inventor: Fumisato Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/799,529

(22) Filed: Mar. 7, 2001

(65) Prior Publication Data

US 2001/0021300 A1 Sep. 13, 2001

(30) Foreign Application Priority Data

Mar. 8, 2000 (JP) ........................................ 2000-064196

(51) Int. Cl.$^7$ ............................................... G02B 6/00
(52) U.S. Cl. .................................... 385/134; 359/341.1
(58) Field of Search ................ 385/134, 12; 359/341.1, 359/341.2, 341.3; 372/6

(56) References Cited

U.S. PATENT DOCUMENTS 5,488,475 A * 1/1996 Friebele et al. ............ 356/35.5
6,104,526 A * 8/2000 Kakui ........................ 359/161

FOREIGN PATENT DOCUMENTS

| JP | 04-011794 | 1/1992 |
|---|---|---|
| JP | 05-297228 | 11/1993 |
| JP | 08-005860 | 1/1996 |
| JP | 08/086920 | 4/1996 |
| JP | 09-055556 | 2/1997 |
| JP | 09-246638 | 9/1997 |
| JP | 9-246638 | 9/1997 |
| JP | 11-211918 | 8/1999 |
| JP | 11-218621 | 8/1999 |
| JP | 2000-091675 | 3/2000 |
| JP | 2001-007428 | 1/2001 |
| JP | 2001-111150 | 4/2001 |
| JP | 2001-119084 | 4/2001 |

OTHER PUBLICATIONS

European Search Report dated Jul. 12, 2001.

* cited by examiner

*Primary Examiner*—Tulsidas Patel

(57) ABSTRACT

An optical amplifying medium has an optical amplifying medium for amplifying signal light, a first substrate on which the optical amplifying medium (e.g., erbium-doped optical fiber) is placed, a second substrate opposite to the fist substrate to sandwich the optical amplifying medium between the fist substrate and the second substrate, and a first temperature control element for controlling the temperature of the fist element, for amplifying light beams of several different wavelengths together to be applied in wavelength-multiplexing transmission so that it provides a property of stable optical amplification and it is prevented from occurring variations in the wavelength characteristics of gain in spite of occurring variations in surrounding temperature.

16 Claims, 8 Drawing Sheets

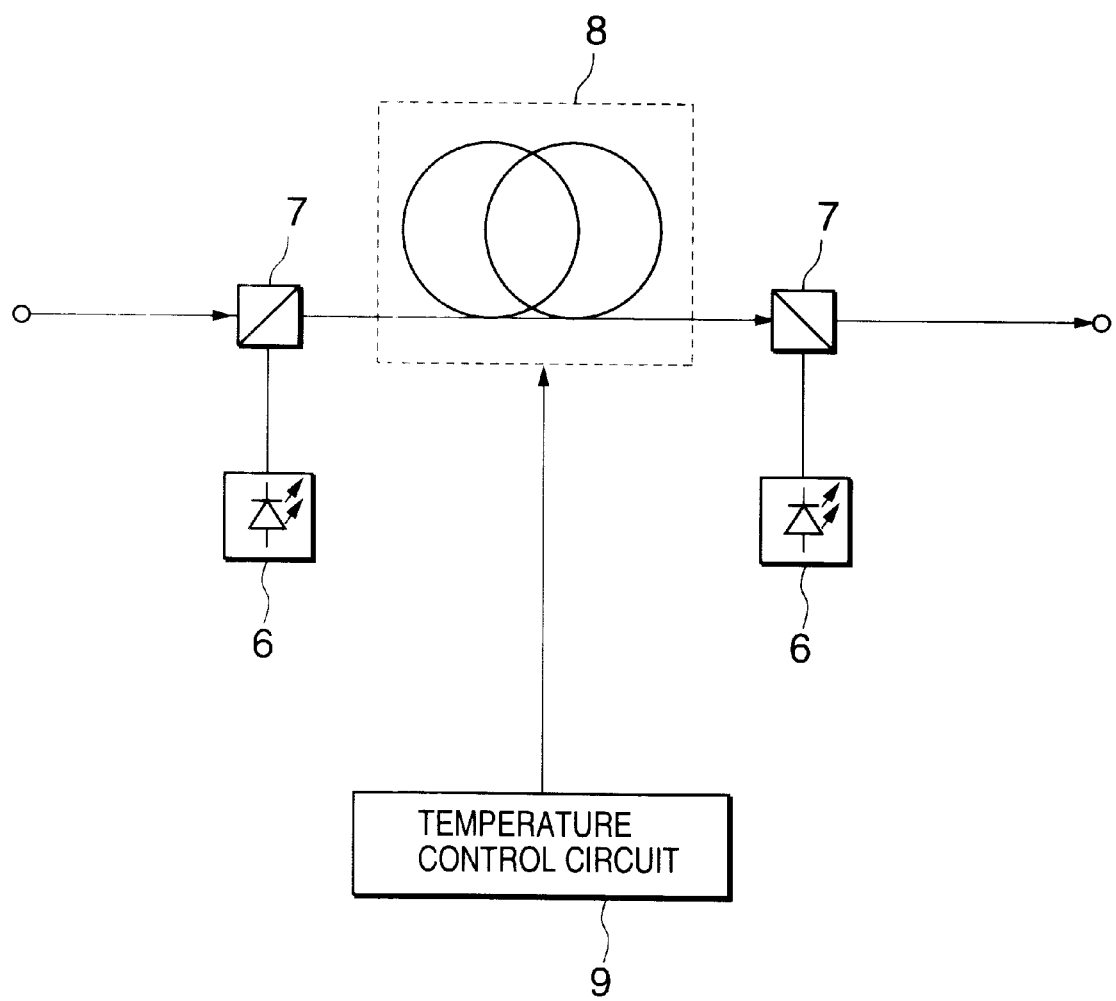

OPTICAL AMPLIFYING MEDIUM COMPONENT AND OPTICAL FIBER AMPLIFIER HAVING THE SAME

BACKGROUND OF THE INVENTION

1. Field of the Invention

The present invention relates to an optical amplifying medium component and an optical fiber amplifier comprising the optical amplifying medium component. Especially, an optical amplifying medium component comprising a rare-earth doped fiber as an optical amplifying medium and having the function of maintaining the temperature of such a fiber constant.

2. Description of the Related Art

In recent years, Wavelength Division Multiplexing (WDM) technology has been developed and proceeded toward practical utilization to cope with growing demand for network access and transmission products in telecommunications as the development of Internet has surged forward. The WDM system allows an increase in the transmission capacity of a single optical fiber transmission line by multiplexing a plurality of signal light beams having different wavelengths onto the optical fiber over a predetermined wavelength band region.

The WDM system can easily increase the transmission capacity of the optical fiber by extending the range of bandwidths to increase the number of optical signals to be multiplexed. In this case, the optical fiber amplifier is required to be one having flat wavelength characteristics of gain (i.e., the increase in the amplitude of a signal is constant) with respect to the broad bandwidth. For instance, optical signals at a wavelength band of 1550 nm is generally used. In this case, an erbium-doped optical fiber (EDF) is used as an optical amplifying medium.

SUMMARY OF THE INVENTION

In the first aspect of the present invention, an optical amplifying medium component includes an optical amplifying medium for amplifying signal light, a first substrate on which the optical amplifying medium is placed, a second substrate opposite to the first substrate to sandwich the optical amplifying medium between the first substrate and the second substrate, and a first temperature control element for controlling the temperature of the first element.

Here, the optical amplifying medium component may further include a second temperature control element for controlling the second substrate.

The optical amplifying medium may be a rare-earth element doped optical fiber.

The optical amplifying medium component may further include a temperature-detecting device for detecting temperature at a predetermined place in the proximity of the optical amplifying medium.

The rare-earth element doped optical fiber may be placed in a plane without bending and crossing; and
the rare-earth element doped optical fiber and the temperature-detecting device are sandwiched between the first substrate and the second substrate.

In the second aspect of the present invention, an optical fiber amplifier includes an optical amplifying medium component, a pumping light source for producing pumping light, and an optical multiplexer for multiplexing the pumping light with signal light to send them to the optical amplifying medium. The optical amplifying medium component includes an optical amplifying medium for amplifying signal light, a first substrate on which the optical amplifying medium is placed, a second substrate opposite to the first substrate to sandwich the optical amplifying medium between the first substrate and the second substrate, and a first temperature control element for controlling the temperature of the first element.

The optical amplifying medium component may further comprise: a second temperature control element for controlling the second substrate.

Here, the optical amplifying medium may be a rare-earth element doped optical fiber.

The optical amplifying medium component may further comprise: a temperature control circuit for adjusting temperature at a predetermined place in the proximity of the optical amplifying medium. If the relationship between the temperature and the wavelength characteristics of gain are investigated in advance, a temperature control circuit may be used for actively adjusting the temperature of the optical amplification medium in the optical amplifying medium component. Therefore, it allows to keep the such a medium entirely at a predetermined temperature so as to obtain desired wavelength characteristics of gain thereof. In this case, the action of gain equalization can be achieved.

BRIEF DESCRIPTION OF THE DRAWINGS

The above and other objects, effects, features and advantages of the present invention will become more apparent from the following description of embodiments thereof taken in conjunction with the accompanying drawings wherein:

FIG. 8 is a block diagram of the optical fiber amplifier comprising the optical amplifying medium component as the third preferred embodiment of the present invention.

DETAILED DESCRIPTION OF THE PREFERRED EMBODIMENTS

For facilitating the understanding of the present invention, we will describe the conventional optical amplifying medium component and the conventional optical fiber amplifier comprising such a component.

Conventionally, wavelength multiplexing has been performed at a wavelength band of 1550 nm (designated as a C-band) in general. Recent years have also seen the consideration given to the use of a wavelength band of 1580 nm (designated as L-band) in addition to the C-band.

Figure 1:
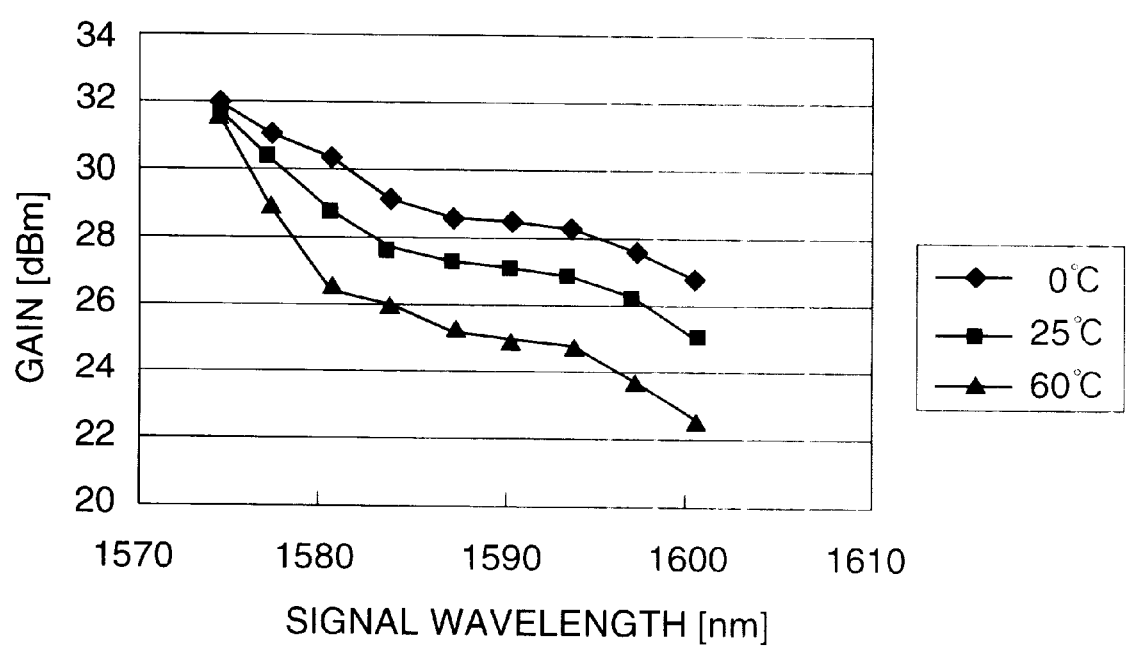
FIG. 1 is a graph that illustrates the relationship between the gain and the wavelength characteristics of the typical erbium-doped optical fiber at different surrounding temperatures.

FIG. 1 shows the wavelength characteristics of gain in an erbium-doped fiber (EDF) at the L-band. As shown in FIG. 1, the wavelength-characteristics of gain in the EDF have a temperature dependency. And the wavelength-characteristic of gain changes by the environmental temperature. Therefore, there is a problem that the wavelength-characteristics of gain in the EDF vary as the surrounding temperature varies.

Figure 2:
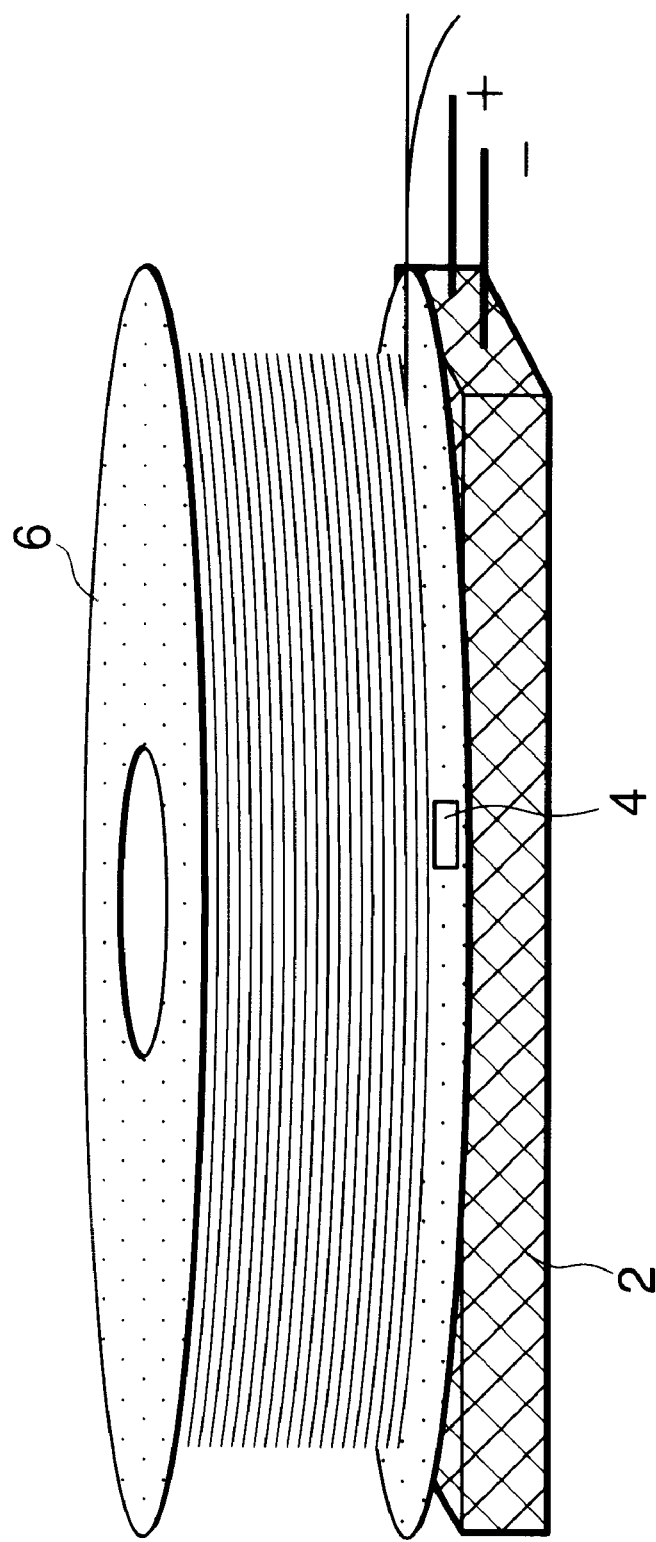
FIG. 2 is a schematic perspective view of the exemplified conventional erbium-doped optical fiber component.

FIG. 2 is an example of the configuration of the conventional temperature-compensated EDF component well known in the art. As shown in the figure, the conventional temperature-compensated EDF component comprises a peltier-effect device 2, an EDF 3 provided as an optical amplifying medium, a thermister 4, and a reel 6. Both the peltier-effect device 2 and the thermister 4 are mounted on the reel 6 while the EDF 3 is wound thereon, so that the temperature of the EDF 3 can be monitored and controlled by the peltier-effect device 2 and the thermister 4 through the reel 6. In this case, however, there are multiple turns of the EDF 3 around the reel 6, so the EDF 3 has a portion touched on the surface of the reel 6 and the rest not touched thereon. As a result, there is a thermal gradient through the whole EDF 3. Thus, it cannot be monitored and controlled under the same conditions because the temperatures of all portions of the EDF 3 may be different from each other.

Figure 3:
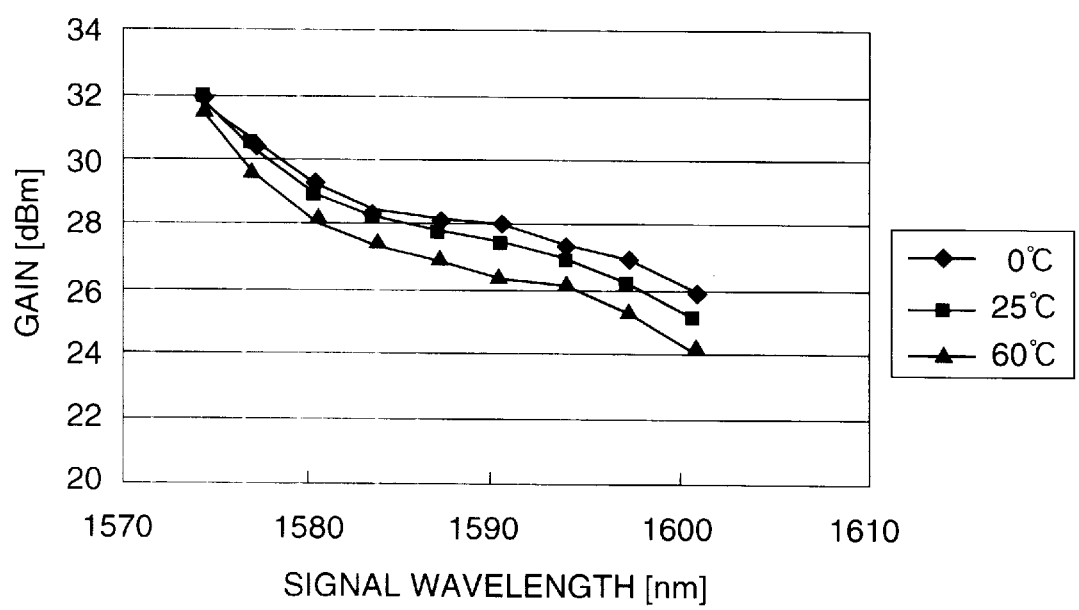
FIG. 3 is a graph that illustrates the relationship between the gain and the wavelength characteristics of the conventional erbium-doped optical fiber component at different surrounding temperatures.

The wavelength-characteristics of gain in the EDF 3 is shown in FIG. 3. As shown in FIG. 3, the gain fluctuates in a range of about 1.5 dB as the surrounding temperature is changed in a range of 0 to 60° C., so that the gain fluctuation is in need of further improvement.

Referring now to attached figures, we will describe novel optical amplifying medium components, and novel optical fiber amplifiers that comprise their respective optical amplifying medium components in accordance with the present invention.

An optical amplifying medium component as a first preferred embodiment of the present invention is capable of adjusting the temperature of a rare-earth element doped optical fiber provided as an optical amplifying medium to ensure a uniform temperature distribution through the fiber such that wavelength characteristics of gain and output of the fiber remain invariant while the surrounding temperature varies.

Figure 4:
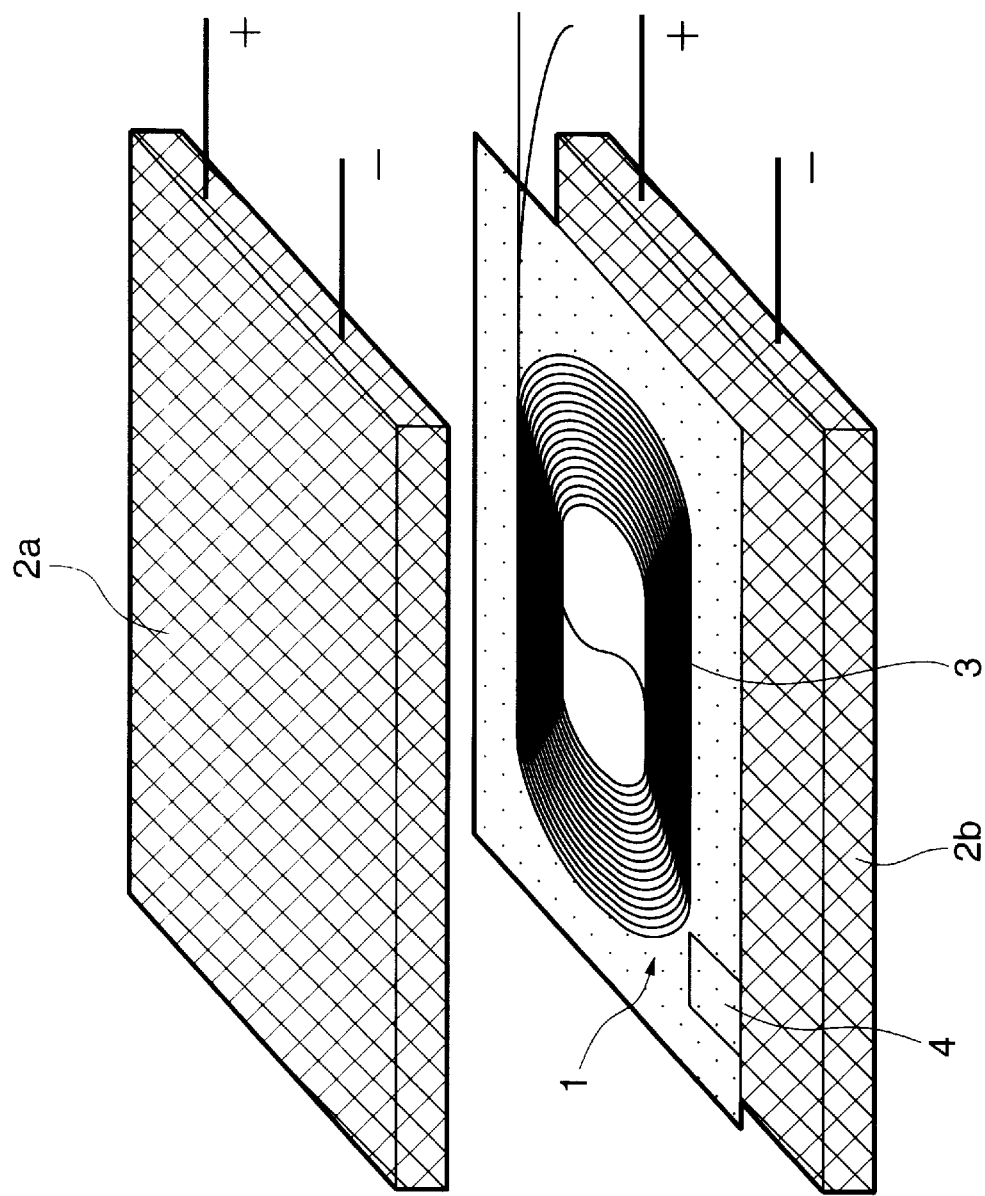
FIG. 4 is a schematic perspective view of the optical amplifying medium component as the first preferred embodiment of the present invention.

FIG. 4 is a schematic perspective view of the optical amplifying medium component of the present embodiment. The optical amplifying medium component comprises: a pair of substrates (i.e., Peltier effect devices) 2a and 2b provided as thin plates capable of heating and cooling any component thereon; and an optical fiber 3 provided as an optical amplifying medium, in which a rare-earth element is doped. In this embodiment, but not limited to, the optical fiber 3 is an erbium-doped optical fiber (hereinafter, abbreviated as "EDF") and wound into a spiral in a plane. The spiral-shaped optical fiber 3 is sandwiched between sheet films described later to form an EDF sheet 1. Then, the EDF sheet 1 is sandwiched between the Peltier effect devices 2a, 2b. These Peltier effect devices 2a, 2b are responsible for altering the surface temperature of the EDF sheet 1 by the passage of a driving current through these devices 2a, 2b to keep the EDF sheet 1 at a constant temperature.

Figure 5:
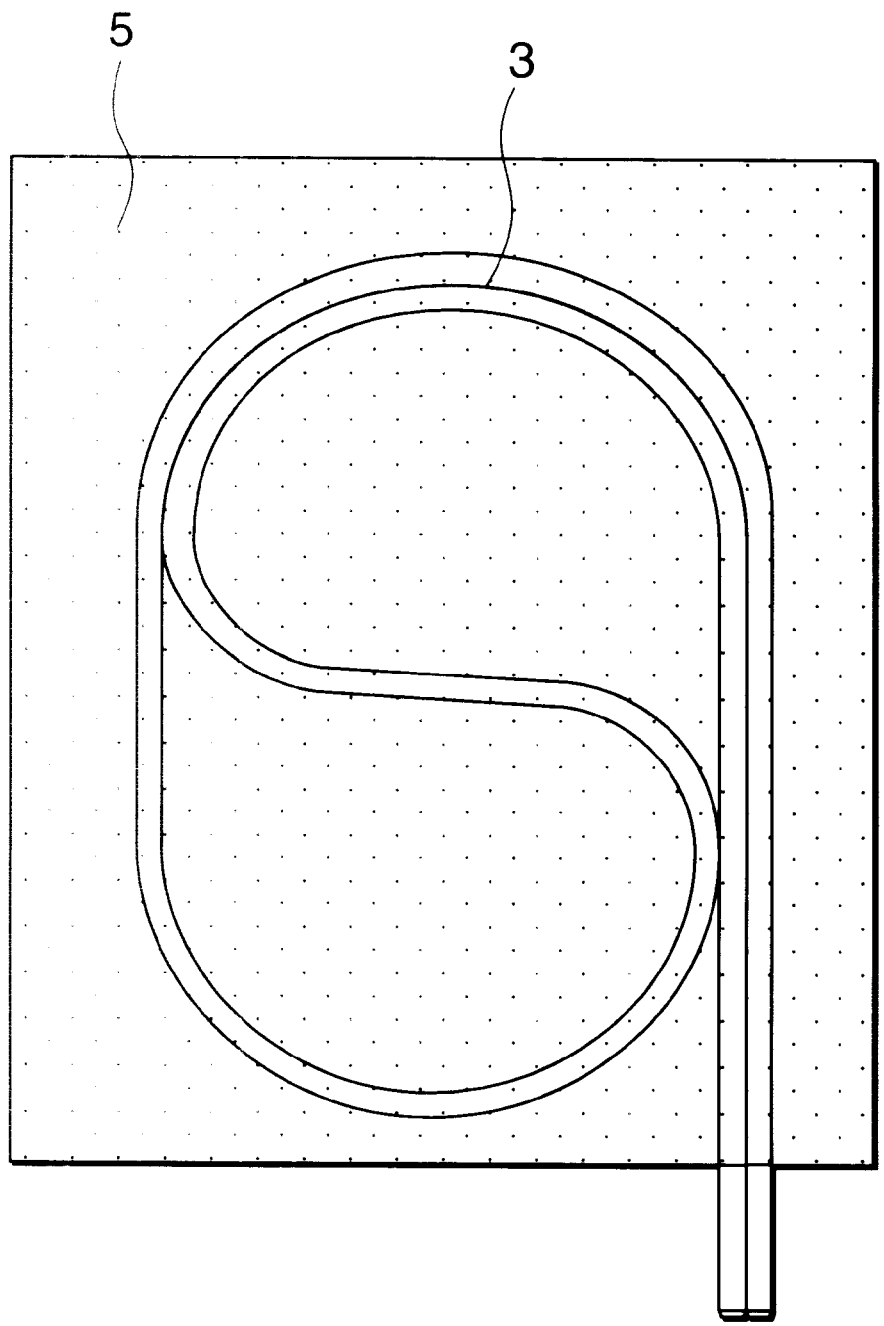
FIG. 5 is a schematic plane view of the optical amplifying medium component as the first preferred embodiment of the present invention.

Next, the EDF sheet 1 will be described in a little more detail. FIG. 5 is a plane view that illustrates an EDF sheet 1 to be applied in the optical amplifying medium component shown in FIG. 4. The EDF sheet 1 is comprised of: an EDF 3 as an optical amplifying medium; and a temperature-sensitive semiconductor device (i.e. thermister) 4 possessing a negative temperature coefficient so that resistance decreases as temperature increases. In this case, as shown in the figure, the EDF 3 and the thermister 4 are arranged in the same plane. In this embodiment, the EDF 3 is an erbium-doped optical fiber of about 40 meter in length. For amplifying incident signal light, in fact, both signal light and pumping light can be introduced into the EDF 3 from the same direction. In this embodiment, as described above, the EDF 3 and the thermister 4 are arranged on one of sheet films 5 and then covered with another one to make a laminated sheet assembly 5 for keeping the EDF 3 from twisting, bending, and crossing. In this embodiment, furthermore, the sheet film 5 may be made of a Teflon-based films or the like.

Subsequently, we will describe the operation of the optical amplifying medium component of the present embodiment shown in FIG. 4. In other words, we will describe how to control the temperature of the EDF 3 in the optical amplifying medium component.

In the EDF sheet 1, as described above, the thermister 4 is provided as a temperature sensor in which its resistance varies with the temperature variations. If the surrounding temperature is higher than ordinary temperature (about 25° C.), the resistance of the thermister 4 on the EDF sheet 1 is decreased. Then, the decrease in the resistance of the thermister 4 is monitored to permit he Peltier effect devices 2a, 2b to feed a driving current or cooling the EDF sheet 1. Therefore, the EDF sheet 1 can be kept at ordinary temperature (about 25° C.). On the other hand, if the surrounding temperature is lower than ordinary temperature, the resistance of the thermister 4 on the EDF sheet 1 is increased and monitored to permit the Peltier effect devices 2a, 2b to feed a driving current for heating the EDF sheet 1. Therefore, the EDF sheet 1 can be kept at ordinary temperature (about 25° C.). As described above, the optical amplifying medium component of the present embodiment allows to keep the temperature of the EDF sheet 1 at ordinary temperature (about 25° C.) regardless of the surrounding temperature.

Figure 6:
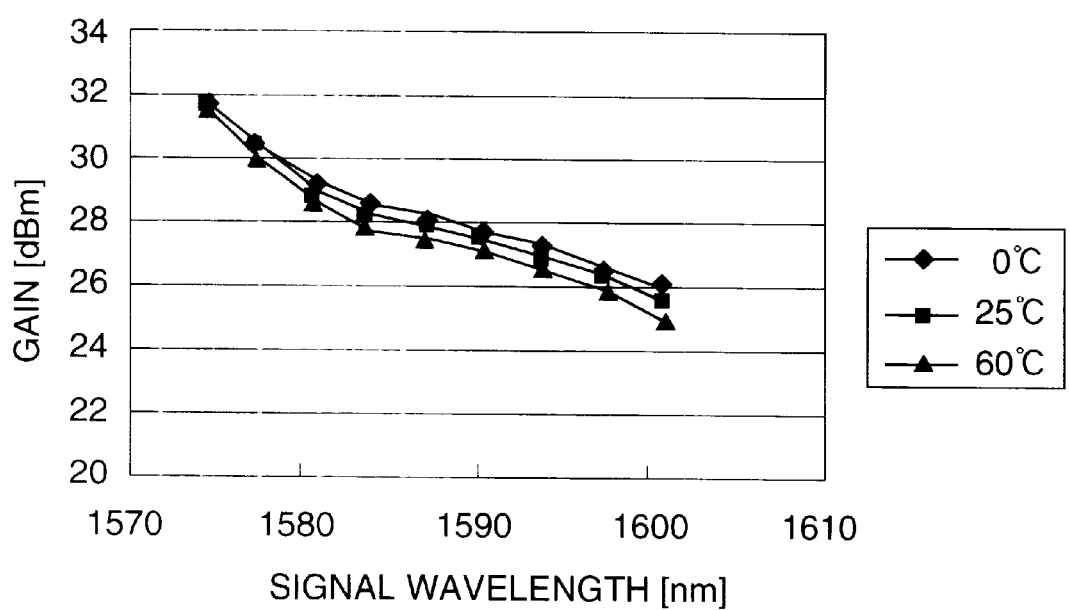
FIG. 6 is a graph that illustrates the relationship between the gain and the wavelength characteristics of the optical amplifying medium component as a first preferred embodiment of the present invention at different surrounding temperatures.

FIG. 6 shows wavelength characteristics of gain with respect to variations in the surrounding temperature when pumping light at a wavelength band of 1480 nm is introduced into the EDF sheet 1 from both directions with a power of 100 mW. At this moment, the incident signal light is provided as 1580 nm wavelength-multiplexed signal light of −25 dBm per a wave. It is shown that the variations in wavelength characteristics of gain are within about 1 dB when the surrounding temperature varies in the range of 0 to 60° C.

In the present embodiment, the Peltier effect devices 2a, 2B are used for heating and cooling the EDF sheet 1. According to the present invention, however, the heating and cooling devices are not limited to the Peltier effect devices 2a, 2b. Other thermal devices well known in the art may be applicable to heat and cool the EDF sheet 1. In addition, one of the Peltier effect devices 2a, 2b may be only provided on one side of the EDF sheet 1 instead of sandwiching the EDF sheet 1 with a pair of the Peltier effect devices 2a, 2b. According to the present invention, furthermore, the EDF sheet 1 may be subjected to a temperature control procedure using a thermal device capable of performing both heating and cooling operations, or using a heater or a cooler. In this embodiment, but not limited, the thermister is used as a temperature sensor. According to the present invention, however, any temperature sensor well known in the art may be used instead of the thermiser. In this embodiment, but not limited to, the Teflon-based film is used as a material for laminating the EDF 3 after arranging it in position. According to the present invention, however, any material well known in the art may be used instead of the Teflon-based film.

Figure 7:
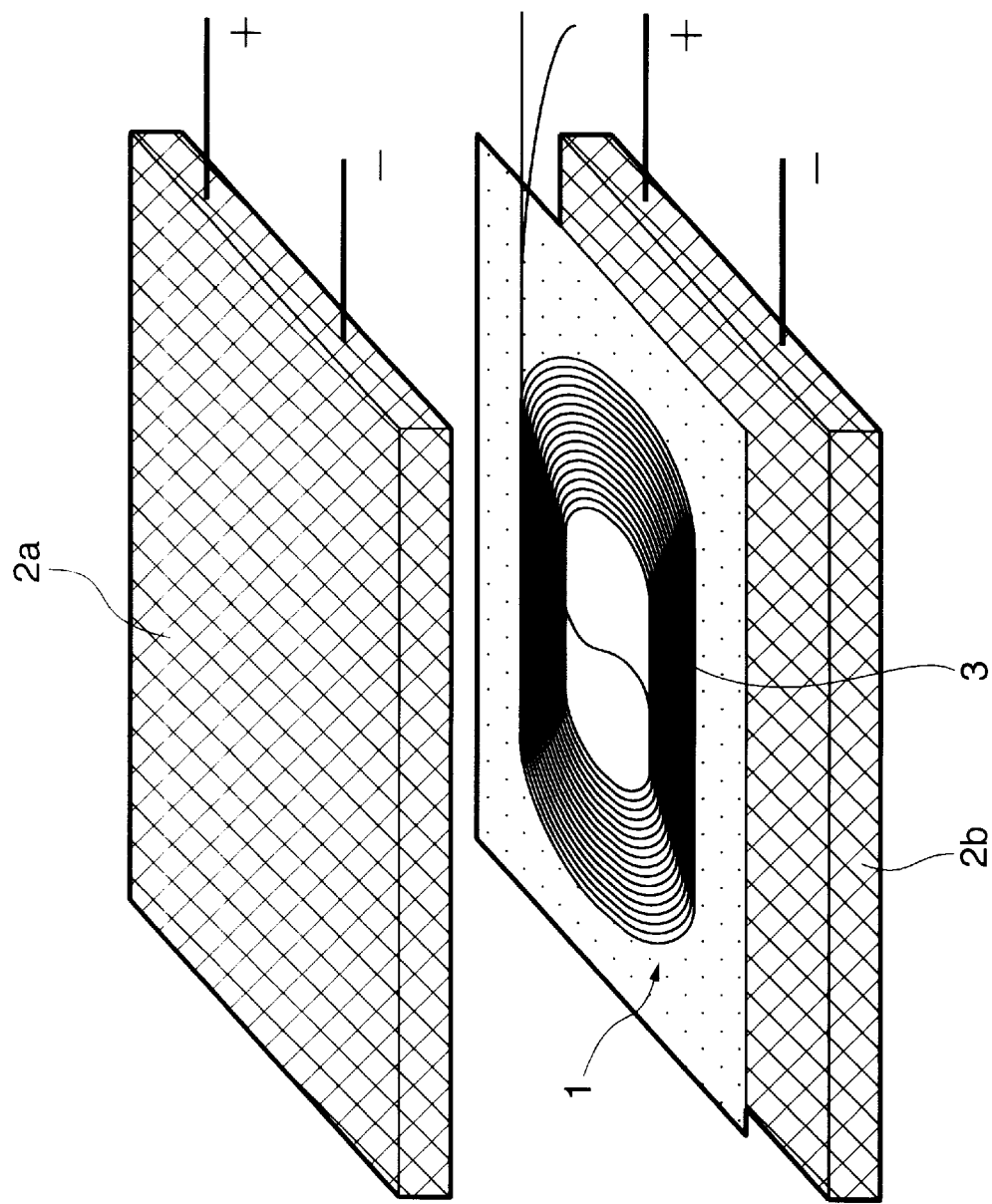
FIG. 7 is a schematic perspective view of the optical amplifying medium component as the second preferred embodiment of the present invention.

FIG. 7 is a perspective view of an optical amplifying medium component as a second preferred embodiment of the present invention. As shown in the figure, the optical amplifying medium component is constructed by the same way as that of the first preferred embodiment shown in FIGS. 4 to 6, except of the absence of thermister 4 in the present embodiment. That is, the optical amplifying medium component of the present embodiment comprises an EDF sheet 1 sandwiched between thin Peltier effect devices 2a and 2b. As with the first embodiment, the Peltier effect devices 2a, 2b are responsible for altering the surface temperature of the EDF sheet 1 by the passage of a driving current through them to keep the EDF sheet 1 at a constant temperature. In this embodiment, however, the thermister 4 is not installed on the device, so that the temperature of the EDF 3 can be controlled by monitoring variations in the spectrum of gain.

In the present embodiment, the Peltier effect devices 2a, 2B are used for heating and cooling the EDF sheet 1. However, just as in the case of the first embodiment, the heating and cooling devices are not limited to the Peltier effect devices 2a, 2b. Other thermal devices well known in the art may be also applicable to heat and cool the EDF sheet 1. In addition, the Peltier effect device may be only provided on one side of the EDF sheet 1 instead of sandwiching the EDF sheet 1 with a pair of the Peltier effect devices 2a, 2b. According to the present invention, furthermore, the EDF sheet 1 may be subjected to a temperature control procedure using a thermal device capable of performing both heating and cooling operations, or using a heater or a cooler. In this embodiment, as with the first embodiment, the thermister is used as a temperature sensor. According to the present invention, however, it is not limited to a specific type of the thermal sensor. Any temperature sensor well known in the art may be used instead of the thermiser. In this embodiment, but not limited to, the Teflon-based film is used as a material for laminating the EDF 3 after arranging it in position. According to the present invention, any material well known in the art may be used instead of the Teflon-based film.

In the following description, we will describe an optical fiber amplifier on which the optical amplifying medium of the first or second preferred embodiment is applied.

FIG. 8 is a schematic diagram of an optical fiber amplifier as a third preferred embodiment of the present invention. The optical fiber amplifier comprises: an optical amplifying medium component 8 of the first or second preferred embodiment; pumping light sources 6 that produce pumping light to bring an optical amplifying medium in the component 8 to a excited state; and an optical multiplexer 7 that multiplexes pumping light with signal light to send them to the optical amplifying medium component 8.

In this embodiment, as shown in FIG. 9, there two pumping light sources 6 positioned on both sides of the optical amplifying medium component 8 for bi-directionally exciting the optical amplifying medium. According to the present invention, however, the optical amplifying medium may be excited in the forward or backward direction.

The optical fiber amplifier has the function of keeping the optical amplifying medium at a constant temperature and stabilizing the wavelength characteristics of gain in the optical amplifying medium by applying the configuration of the optical amplifying medium component disclosed in the first or second preferred embodiment. If the relationship between the temperature and the wavelength characteristics of gain are investigated in advance, a temperature control circuit may be used for actively adjusting the temperature of the EDF 3 in the optical amplifying medium component 8. Therefore, it allows to keep the EDF 3 entirely at a predetermined temperature so as to obtain desired wavelength characteristics of gain. In this case, the action of gain equalization can be allowable.

As described above, the optical fiber amplifier of the present embodiment comprises the optical amplifying medium component of the first or second preferred embodiment, so that an optical amplification can be performed while the wavelength characteristics of gain in the optical amplifying medium is stabilized. In addition, the EDF provided as the optical amplifying medium is configured in a sheet structure and the whole package provided as the EDF sheet is extremely compact, so that the EDF saves space in the optical fiber amplifier.

In summary, the optical amplifying medium component of the present invention comprises an optical amplifying medium for optically amplifying signal light, a first substrate on which the optical amplifying medium is placed, a second substrate opposite to the fist substrate to sandwich the optical amplifying medium between the fist and second substrates, and a first temperature control element for controlling the temperature of the fist element. A second temperature control element for controlling the second substrate may be also installed on the optical fiber amplifier. These temperature control elements allow the temperature control of the optical amplifying medium (e.g., EDF) in an efficient manner. Therefore, the optical amplifying medium component can be prevented from occurring variations in wavelength characteristics of gain in response to the variations in surrounding temperature. In the present invention, particularly, an optical amplifying medium (e.g., EDF) with a sheet shape may be sandwiched between thin Peltier effect devices to allow the passage of a driving current of the Peltier effect devices through the optical amplifying medium, so that the temperature of the EDF can be stabilized and both the gain and the wavelength characteristics thereof can be also stabilized.

The optical amplifying medium component of the present invention uses: the EDF sheet in which the EDF is placed properly in a plane; and the thin Peltier effect devices, so that the whole EDF component is extremely compact enough to save space and fits in a small space when the optical fiber amplifier is constructed. Furthermore, the optical amplifying medium allows to keep the EDF 3 entirely at a predetermined temperature to obtain desired wavelength characteristics of the gain, so that it allows the action of gain equalization.

While this invention has been described in connection with certain preferred embodiments, it is to be understood that the subjects matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical amplifying medium for amplifying signal light, comprising:
   a rare-earth element doped optical fiber;
   a first temperature control element for controlling a temperature of the rare-earth element doped optical fiber; and
   a second temperature control element for controlling the temperature of the rare-earth element doped optical fiber,
   wherein the rare-earth element doped optical fiber is wound around in a plane form without crossing in three-dimensions, and the rare-earth element doped optical fiber is sandwiched between the first and second temperature control elements.

2. An optical amplifying medium component as claimed in claim 1, further comprising:
   a temperature-detecting device for detecting temperature at a predetermined place in the proximity of the optical amplifying medium.

3. An optical fiber amplifier comprising:
   an optical amplifying medium component as claimed in claim 1;
   a pumping light source for producing pumping light; and
   an optical multiplexer for multiplexing the pumping light with signal light to send them to the optical amplifying medium.

4. An optical fiber amplifier comprising:
   an optical amplifying medium component as claimed in claim 2;
   a pumping light source for producing pumping light; and
   an optical multiplexer for multiplexing the pumping light with signal light to send them to the optical amplifying medium.

5. An optical fiber amplifier as claimed in claim 1, further comprising:
   a temperature-control circuit for adjusting temperature at a predetermined place in the proximity of the optical amplifying medium to a predetermined temperature.

6. An optical fiber amplifier as claimed in claim 2, further comprising:
   a temperature-control circuit for adjusting temperature at a predetermined place in the proximity of the optical amplifying medium to a predetermined temperature.

7. An optical fiber amplifier as claimed in claim 3, further comprising:
   a temperature-control circuit for adjusting temperature at a predetermined place in the proximity of the optical amplifying medium to a predetermined temperature.

8. The optical fiber amplifier as claimed in claim 3, wherein said optical amplifying medium component further comprises a temperature-detecting device for detecting temperature at a predetermined place in the proximity of the optical amplifying medium.

9. The optical fiber amplifier as claimed in claim 5, wherein said optical amplifying medium component further comprises a temperature-detecting device for detecting temperature at a predetermined place in the proximity of the optical amplifying medium.

10. An optical fiber amplifier comprising:
    an optical amplifying medium component as claimed in claim 5;
    a pumping light source for producing pumping light; and
    an optical multiplexer for multiplexing the pumping light with signal light to send them to the optical amplifying medium.

11. An optical amplifying medium component for amplifying signal light, comprising:
    an optical fiber;
    a first temperature control element for controlling a temperature of the optical fiber; and
    a second temperature control element for controlling the temperature of the optical fiber;
    wherein the optical fiber is formed on a plane without intersecting itself.

12. The optical amplifying medium component as claimed in claim 11, wherein optical fiber is sandwiched between the first and second temperature control elements.

13. The optical amplifying medium component as claimed in claim 11, wherein the optical fiber comprises a rare-earth element doped optical fiber, and
    wherein said optical fiber is formed so as to be coiled on a single plane.

14. The optical amplifying medium component as claimed in claim 11, further comprising:
    a first sheet film on a first side of said optical fiber; and
    a second sheet film on a second side of said optical fiber,
    wherein said first sheet film and said second sheet film sandwich said optical fiber to form an erbium-doped fiber sheet.

15. The optical amplifying medium component as claimed in claim 14, wherein the erbium-doped fiber sheet comprises a temperature-sensitive semiconductor device.

16. The optical amplifying medium component as claimed in claim 14, wherein said first sheet film and said second sheet film comprise a Teflon-based film.

* * * * *